(12) United States Patent
Evans

(10) Patent No.: US 8,573,437 B1
(45) Date of Patent: Nov. 5, 2013

(54) FOOD PLATE AND BEVERAGE CONTAINER HOLDER

(76) Inventor: Ronald G. Evans, Las Vegas, NV (US)

(*) Notice: Subject to any disclaimer, the term of this patent is extended or adjusted under 35 U.S.C. 154(b) by 191 days.

(21) Appl. No.: 12/946,833

(22) Filed: Nov. 15, 2010

Related U.S. Application Data

(63) Continuation-in-part of application No. 11/161,246, filed on Jul. 27, 2005, now abandoned.

(60) Provisional application No. 60/521,960, filed on Jul. 27, 2004.

(51) Int. Cl.
*B65D 25/00* (2006.01)

(52) U.S. Cl.
USPC ......... 220/737; 220/23.4; 220/23.8; 220/574; 220/575; 206/562

(58) Field of Classification Search
USPC ......... 220/23.4, 23.8, 574, 575, 737; 206/562
See application file for complete search history.

*Primary Examiner* — Anthony Stashick
*Assistant Examiner* — Elizabeth Volz
(74) *Attorney, Agent, or Firm* — Kenehan & Lambertsen, Ltd.; John C. Lambertsen

(57) ABSTRACT

A beverage container holder is provided, consisting of an elongated body having a planar upper support surface having alternative engagement mechanisms on opposing ends and at a mid-point thereof. At one end an aperture is formed, having a support suspended therein to receive and retain a beverage container—cup, glass or can. At an opposing end and at a midpoint of the planar upper support surface, a pair of apertures cooperates with the thumb and fingers of a user's hand, to position and secure a food plate against an upper surface of the beverage container holder. The thumb and fingers extend through the apertures from a position below the holder, and in gripping the food plate, the user is also grasping the holder—which in turn may be carrying a beverage container held within the beverage-receiving aperture.

4 Claims, 3 Drawing Sheets

FOOD PLATE AND BEVERAGE CONTAINER HOLDER

CROSS-REFERENCE TO RELATED APPLICATION

This application is a continuation-in-part of co-pending U.S. patent application Ser. No. 11/161,246, which was filed on Jul. 27, 2005, and claims the benefit of U.S. Provisional Application Ser. No. 60/521,960, filed Jul. 27, 2004; both identified applications are incorporated by reference herein for all that they contain.

BACKGROUND OF THE INVENTION

1. Field of the Invention

The present invention relates to holders, and more specifically to beverage container holders for use with food plates. More specifically, the present invention relates to a beverage container holder that engages with a user's hand in a manner that permits one hand through the leverage design to simultaneously support a plate of food and the holder containing a beverage container.

2. Description of the Prior Art

When dining, particularly in buffet or stand-up, party settings, a guest is often called upon to simultaneously hold both a plate and a beverage container. This may occur while in a buffet line obtaining food and beverages, or while moving about an event, mingling with other guests, while food is being served.

On such occasions that guest is not likely to have direct or consistent access to a table or counter for beverage placement in order to fill or eat from their plate. This situation makes it difficult for guests to enjoy the party or event while mingling with other guests without worrying about spilling their food, their beverage or both. Some guests resort to having another guest hold their beverage, or put it down at a "safe" location while eating and mingling, only to have trouble remembering where that "safe" place was when it comes time to take a drink.

Various cup-holders are known, for example, U.S. Letters Pat. No. 2,719,414 to Davis discloses a cup holding device that is detachably secured to a plate for use when eating away from a table. Although this device may work well in some instances, the plates on which it is used must be of sufficiently strong construction as will support the weight of the beverage-filled cup hanging from its side along with the weight of the food on the plate itself.

Most disposable paper and plastic plates are not strong enough to support this combined weight and therefore the Davis device would be useless in cases where these weaker types of disposable plates are provided for an event. In addition, the beverage container is solely supported by the ring holder, requiring the use of tapered beverage containers—precluding the use of glasses or most cans.

Attachment of the holder to the plate may also present some problems when it comes time to re-fill the container or to refill, dispose of, or exchange the plate when food service is complete. Additionally, construction of the device is potentially complicated and expensive with respect to the spring loaded connection member.

A patent to Boatwright (U.S. Pat. No. 5,110,170) discloses a combination plate and cup holding device that has a curved supporting member that is received by and held against an edge of the plate. A handle extends under a bottom surface of the plate, and may be gripped by the user to secure the supporting member against the plate.

The Boatwright device also depends upon the strength of the plate construction for some, if not all, of the success of the device. In addition, the Boatwright device does not provide flexibility with respect to changes in plate size—the supporting member defines a certain arc length and radius, and may not work well with larger or smaller plate sizes. Additionally, the Boatwright cup holder, like the previously noted Davis device, can only be used with tapered beverage containers, and not straight-sided glasses or cans. The construction of the device is also potentially complicated and expensive with respect to the curves and angles that must be constructed to adequately support the plate and cup.

Norris (U.S. Pat. No. 5,662,240) modifies disposable plates by adding handles to the bottom of the plates, permitting a person to hold the plates from the bottom while holding beverage containers with the same hand. This device requires either the modification of existing disposable plates or the manufacture of new disposable plates with the handles. The handles proposed to be added to the bottom of the plates are not adjustably sized to be flexible in relation to varying sizes of hands. The likelihood that the use of the newly modified plates will replace the use of common, familiar, and economical plates is very small which detracts from the feasibility of this device.

A need exists for a simple and economically feasible alternative to spilling or being forever on the hunt, by which a person can comfortably and securely simultaneously carry and use a plate, or other food container, and a beverage container, without dependence on locating a separate surface upon which to place their beverage container while eating from the plate.

SUMMARY OF THE INVENTION

It is an object of the present invention to provide a beverage container holder that is reliable and economical, and that can be used by either the left or right hand to hold a beverage container while holding a common reusable or disposable plate or food container in the same hand simultaneously.

It is a further object of the present invention to provide a beverage container holder with an elongated body having at one end, a receptacle of sufficient size to retain various sizes of reusable or disposable tapered beverage containers, and including a support member for the bottom of non-tapered beverage containers, such as cans and glasses. The elongated body having at the opposite end a means by which the fingers of the hand or the whole hand can, by leverage and pivot action, securely support the device against overturning when a beverage container is retained in the beverage container aperture and regardless of whether a plate or food container is being held in that hand.

It is a further object of the present invention to provide a beverage container holder that provides a centrally located aperture through which the thumb of a user's hand must extend, enabling the user to securely hold the rim of the plate or food container, and provide the pivot point for the leverage action used to resist the overturning forces applied by the beverage container.

It is a still further object of the present invention to provide a beverage container holder that can be used to retain a variety of common reusable or disposable cups, glasses, cans or bottles—including such containers as possess non-tapered sides.

It is a further object of the present invention to provide a beverage container holder that is compatible with a variety of common reusable or disposable plates or food containers, and is not dependent upon the size, shape or strength of the plate or food container for the successful use of the holder.

It is a further object of the present invention to provide a beverage container holder that, by not in fact holding the plate, allows the user the flexibility to hold or remove the food plate from their hand without affecting the ability of the hand to securely retain the beverage container including the beverage.

It is a further object of the present invention to provide a beverage container holder that can be easily and economically manufactured of several different materials and in several different styles making it reusable or disposable, and appropriate for casual or formal occasions.

It is a further object of the present invention to provide a beverage container holder that is stackable in bulk for easy packaging for sale or distribution.

The present invention fulfills a pressing, long-felt need by providing a means by which one hand can now perform the tasks that previously required two hands. The user can now simultaneously hold a plate of food and a beverage in one hand while freely moving about a room. The user can now eat from the plate or drink from the beverage container without having to place either item on a table or counter, or have a companion guest hold the beverage, permitting the user to eat from the plate. The device can be stacked and packaged in bulk for distribution in various quantities.

The present invention accomplishes the foregoing with a pivot and leverage based design that is sturdy, reliable, simple and flexible for use by the right or left handed user, without excessive costs for manufacture, without dramatic changes in the manner in which the plate is held by the hand, and without requiring a change in the use of common and economical reusable or disposal plates and cups, which are already in wide use.

These objects, as well as other objects and advantages of the present invention will become readily apparent upon review of the description of non-limiting illustrative embodiments and the accompanying drawings.

DETAILED DESCRIPTION OF THE PREFERRED EMBODIMENTS

Figure 1:
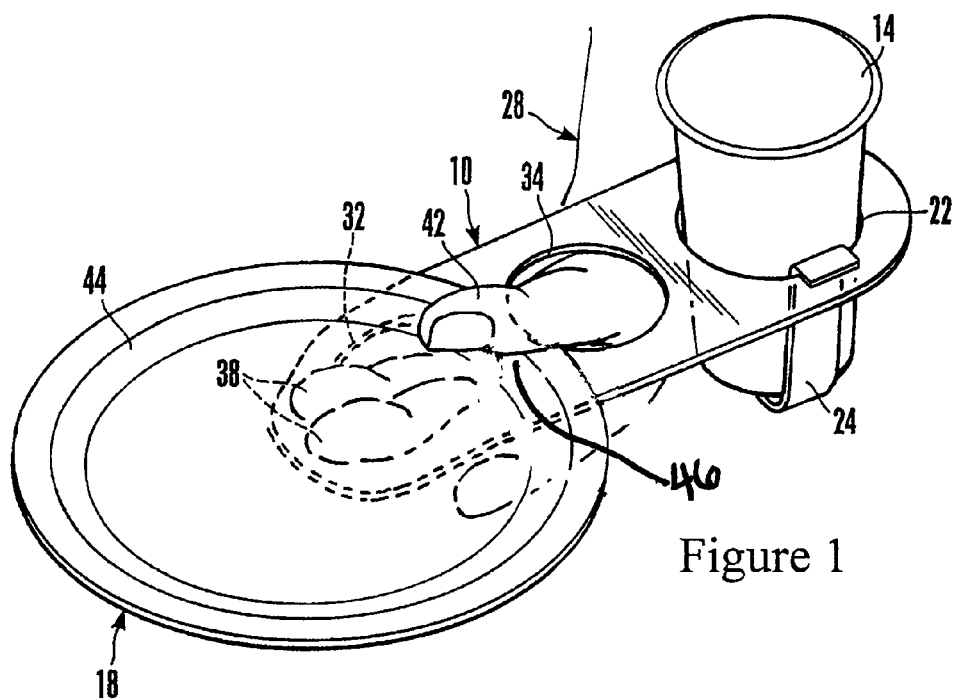
FIG. 1 is a perspective view showing a beverage container holder in use in accordance with the present invention.

Reference is now made to the drawings wherein like numerals refer to like parts throughout. In FIG. 1, a beverage container holder 10 is shown supporting a beverage cup 14 and the fingers of a hand support a food plate 18. The cup 14 is received within a beverage container aperture formed in the beverage container holder 10, and is supported within the beverage container aperture 22 by a suspended hanger 24.

The food plate 18 is gripped by a user's hand 28, and a pair of retention apertures—a finger aperture 32 and a thumb aperture 34—are formed in the beverage container holder 10 for this purpose. When gripping a food plate 18 in the hand, the user 28 extends a pair of fingers 38 through the finger aperture 32 and a thumb 42 through the thumb aperture 34. The food plate 18 is received between the pair of fingers 38 and the thumb 42, with a segment of the rim 44 of the food plate 18 resting against an upper surface 46 of the beverage container holder 10 which is resting in the palm of the user's hand 28.

Figure 2:
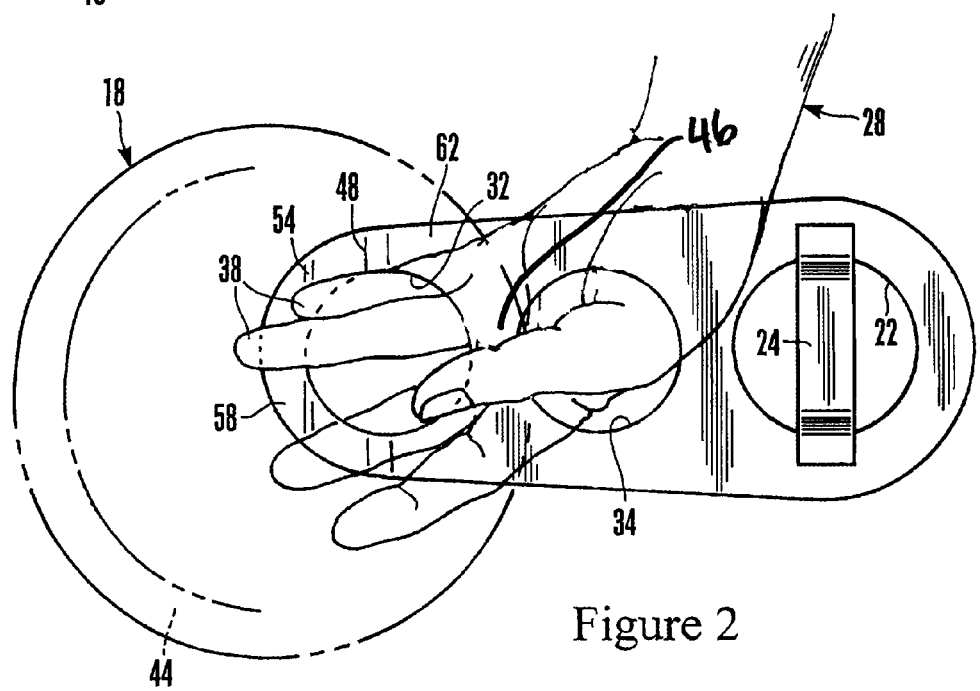
FIG. 2 is a plan view, with a plate shown in phantom, showing a pivot and leverage manner of engagement between a user's hand and a beverage container holder in accordance with the present invention.

FIG. 2 provides additional details in regard to the manner by which a pair of fingers 38, the thumb 42 of the user's hand 28, and beverage holder 10 together cooperate to grip and support the food plate 18 (shown in phantom in FIG. 2). The thumb 42 extends through the thumb aperture and out over the rim of the plate 44. From this superposed position, the thumb 42 presses and holds the food plate 18 against the upper support surface 46 of the beverage container holder 10. Additionally, the thumb aperture 34 rests around and against the base of the user's thumb 42 as the pivot point for the leverage action of the beverage container.

Additional support of the food plate 18 is provided by the pair of fingers 38 that extend through the finger aperture 32 and to a centrally-located position beneath the food plate 18. To enable the full extension of the other two fingers of the hand beneath the food plate 18, an outward bend 48 is formed in the beverage container holder 10 adjacent the lower aperture 32.

The outward bend 48 results in a portion of the food and beverage container holder 10 being spaced from the plane defined by the interface of the food plate 18 and the adjacent upper surface 46 of the beverage container holder 10. This spacing provides a location for the pair of fingers 38 to extend beneath the food plate 18 and for the other two fingers of the hand to extend around and further support the bottom of the plate. A second, inward bend in proximity to a terminus of the beverage container holder 10 defines a finger support shelf 58 that retains the beverage container holder against overturning forces by extending under the fingers of hand 38 and cooperating with the thumb aperture 34 and the thumb 42 in the leverage action of the beverage container holder. The two fingers of the hand 38 rest against the finger support shelf 58 during their engagement with a bottom surface of the food plate 18.

In this manner the fingers, thumb, and hand of the user 28, and the beverage container holder 10, form a unitary assembly. Therefore, since the food plate 18 is never physically attached to the beverage container holder 10, while gripped as described above, a secure and stable platform is provided for the food plate 18. Such stability is of immense value as food is added to and removed from the food plate 18 during food service at parties and other social events.

Figure 3:
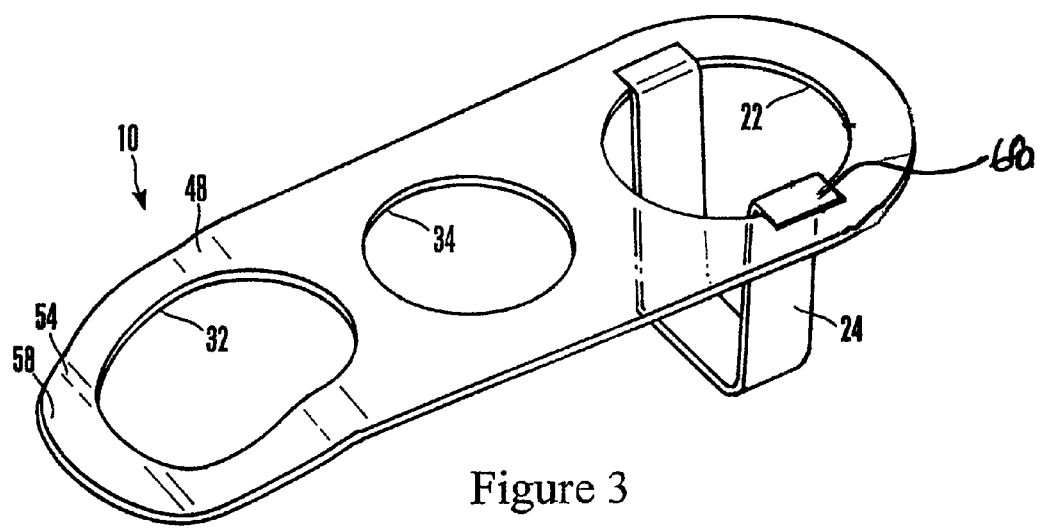
FIG. 3 is a perspective view of a beverage container holder in accordance with the present invention.

Additional structural details of the beverage container holder 10 are shown in FIG. 3. The suspended hanger 24 is shown extending from a pair of support ears 68 that engage an upper surface of the beverage container holder 10 adjacent the beverage container aperture 22. The suspended hanger 24 is otherwise not connected to the food and beverage holder 10, enabling for the simplified fabrication and storage thereof.

Figure 4:
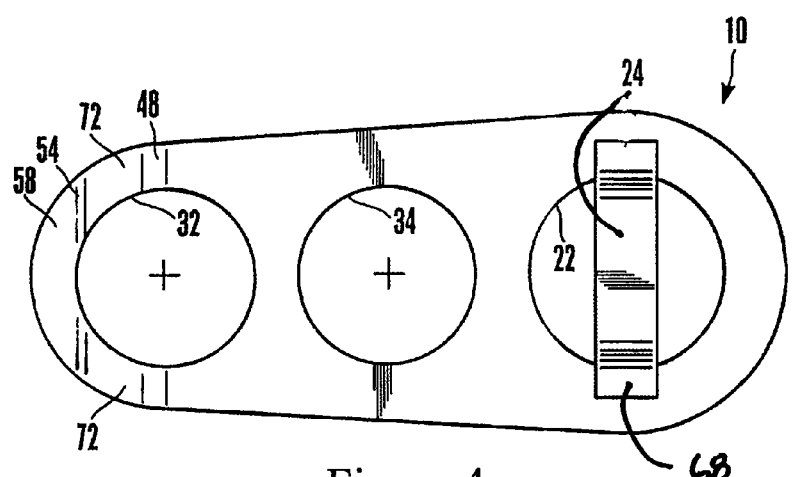
FIG. 4 is a plan view of a beverage container holder in accordance with the present invention.
Figure 5:
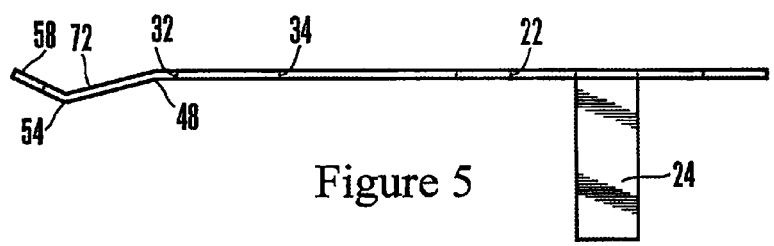
FIG. 5 is a side elevation view of a beverage container holder in accordance with the present invention.

The outward bend 48 and the inward bend 54 lie substantially adjacent the finger aperture 32, and are separated by a deflected border 72 (see FIG. 4). As is best shown in FIG. 5, the finger support shelf 58 is canted relative to the deflected border 72. The finger support shelf 58 angles back towards the plane defined by the interface between the beverage container holder 10 and the food plate 18 when the latter is positioned thereon.

Just prior to use, the beverage container holder 10 is positioned over the left or right hand of the user 28, with the hand in a palm-up orientation. The hand of the user 28 is brought into position beneath the beverage container holder 10, which is received by entry of the thumb 42 and the fingers 38 into the thumb aperture 34 and the finger aperture 32, respectively. The majority of users choose to insert the third and fourth fingers into the finer aperture 32. However, for users with a smaller hand the insertion of additional fingers into the finger aperture 32 is also contemplated by the present invention.

Upon proper finger and thumb positioning, the bottom surface of the beverage container holder 10 lies against the palm and wrist of the user 28. The food plate 18—full, empty or somewhere in-between, may then be placed in the palm of the user's hand 28 above the upper surface 46 of the beverage container holder 10, resting against both it and upon the extended fingers 38 of the user 28. The thumb 42 is then placed over the plate rim 44 to secure the food plate 18 in place upon the upper surface 46 of the beverage holder 10 in the palm of the user's hand 28. At this point food can be placed upon or removed from (or both) the food plate 18.

The beverage cup 14 (or other type of beverage container) can be placed into the beverage container aperture 22. The hand of the user 28 at this point is capable of supporting both the food plate 18 and the beverage cup 14 through use of the beverage container holder 10 because of the pivot and leverage design in accordance with the present invention. The other hand of the user (not shown in the Figures) remains free to be used for eating and drinking, as well as to secure other food or drink—both of which are being held by the user's hand 28 utilizing the beverage container holder 10. The otherwise destabilizing weight of the beverage cup 14 is countered by the pivot and leverage action of the fingers and thumb insertion into their respective apertures of beverage holder 10, which then straddles the hand of the user 28. Further stability is obtained by the positioning of the thumb 42 against the rim 44 of the food plate 18 when it is placed in the hand of the user 28.

In a presently preferred embodiment, the beverage container holder 10 is fabricated by cutting and bending a plastic material, preferably of approximately 3/32-inch thickness. Returning once again to FIGS. 3-5, the beverage holder 10 has an overall length of approximately 10½ inches, and a width of approximately 4½ inches at the beverage container aperture 22 that narrows to about 3⅝ inches at the outward bend 48 that lies adjacent the finger aperture 32. The distance from the initial portion of the outward bend 48 to the tip of the finger support shelf 58 is approximately 9/16 inch and consists of a deflected border 72 of length 1 inch and the finger support shelf 58 that extends approximately 2¼ inches along its central axis.

The finger aperture 32 and the thumb aperture 34 both measure approximately 2½ inches in diameter, and the beverage container aperture 22 approximately 2⅞ inches in diameter. The suspended hanger preferably extends downwardly approximately 2¾ inches, with the support ears 68 extending approximately ⅜ inch outward from the edge of the beverage container aperture 22.

Figure 6:
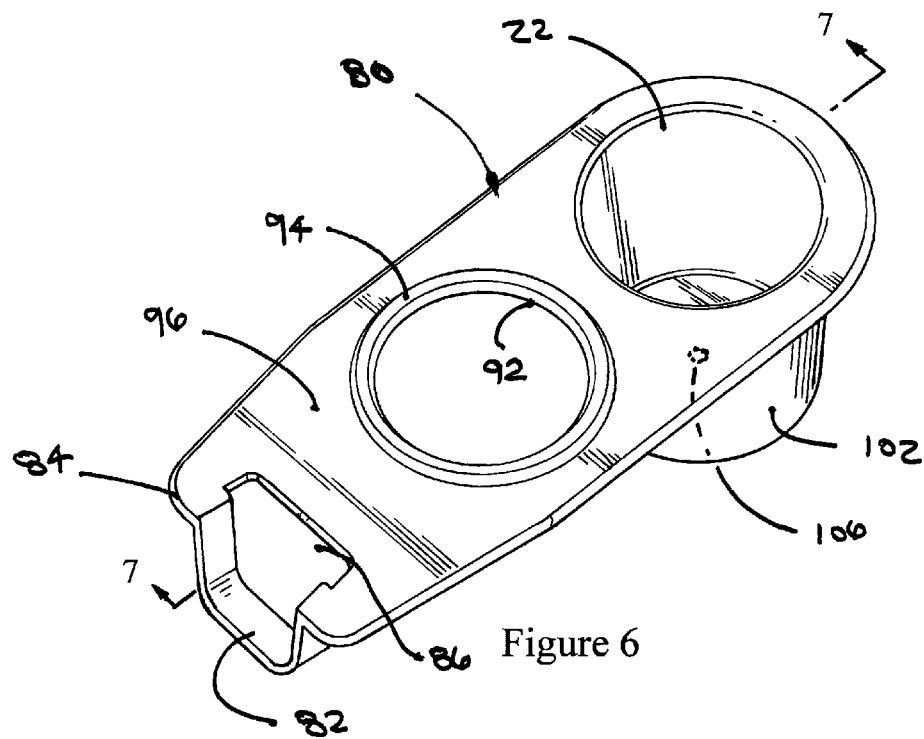
FIG. 6 is a perspective view of an alternative design for a beverage container holder in accordance with the present invention.

An alternative design utilizing a beverage container holder 80 is shown in FIG. 6. A substantially u-shaped finger support shelf 82 is formed at a first end 84 of the beverage container holder 80, and consists of a finger aperture 86 extending inward from the first end 84 and a finger support shelf 82 that is attached to and extends below opposing sides of the finger aperture 86.

A thumb aperture 92 is formed in the beverage container holder 80 at a central location therein. The location of the finger aperture 86 and the thumb aperture 92 enable the thumb and fingers of a user's hand (not shown in FIG. 6 or 7) to be received by the beverage container holder 80 in a manner similar to that discussed above in the context of an alternative design. A raised ring 94 is circumferentially formed about and immediately adjacent the thumb aperture 92. The raised ring 94 provides structural reinforcement to the thumb aperture 92 and comfort for the thumb extending through it. In addition, the material forming the raised ring 94 projects above the adjacent holder surface 96 of the beverage container holder 80.

The beverage container aperture 22 remains located within the beverage container holder 80 at a location distant and opposite from the finger aperture 86. A cup-like member 102 is formed within the container aperture 22 and extends below the beverage container holder 80. The cup-like member 102 is preferably of substantially the same diameter as the beverage container aperture 22—both capable of receiving beverage containers (not shown) having typical diameters (not supersized). As is best described with reference to FIG. 7, a central drainage opening 106 is formed in a bottom 108 of the cup-like member 102. The central drainage opening 106 enables the quick drainage of any spills or sweating liquid that might form upon the surface of a chilled beverage.

Figure 7:
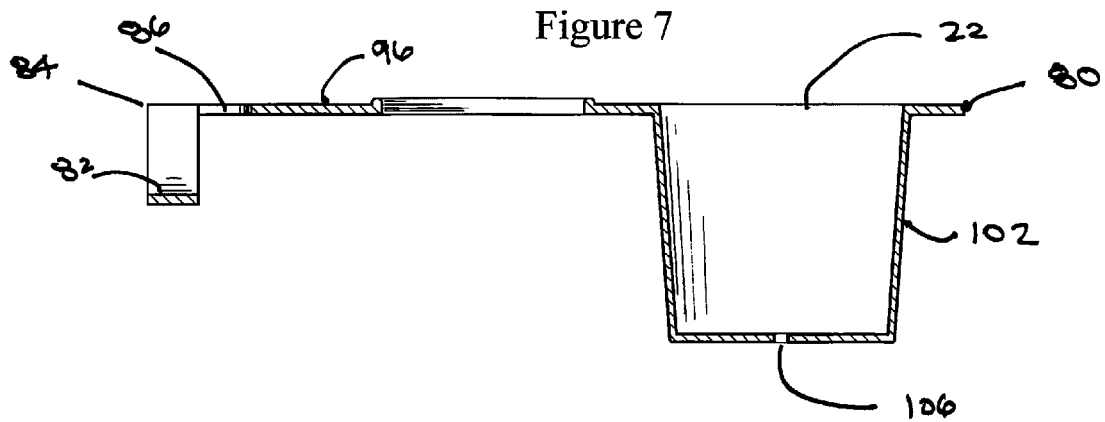
FIG. 7 is a cross-sectional view taken along line 7-7 of FIG. 6 showing a beverage container holder of an alternative design.

In a presently preferred embodiment the alternative, beverage container holder 80 is fabricated out of a plastic of approximate thickness ⅛ inch (this measurement and all of the following are approximate in nature and meant to provide an example, and should not be viewed in any manner as a limitation(s)). Referring to FIGS. 6 and 7, the beverage container holder 80 is 10 inches in length and, at its widest, is 4½ inches in width, narrowing at the first end 84 to 3½ inches in width. The diameter of the thumb aperture 92 is 2½ inches and the beverage container aperture 22 is 3 inches. The raised ring 94 projects approximately ⅛ inch above the surrounding holder surface 96. The cup-like member 102 has a depth of approximately 3 inches, with the drainage opening 106 having a ¼ inch diameter.

The finger aperture 86, if viewed from a side elevation, has a height of 1 inch, a width of 2⅛ inches, and a depth of approximately 1¼ inches. The finger support shelf 82 measures approximately ⅝ inch wide.

My invention has been disclosed in terms of a pair of preferred embodiments thereof, which provide a beverage container holder that is of great novelty and utility.

Various changes, modifications, and alterations in the teachings of the present invention may be contemplated by those skilled in the art without departing from the intended spirit and scope thereof. It is intended that the present invention encompass such changes and modifications.

I claim:

1. A holder for a beverage container comprising:
   an elongated planar body that can be held over one hand of a user and under a plate held in said one hand, said elongated planar body including a beverage containing aperture, a finger retaining aperture, and a thumb aperture, wherein:
      said beverage container aperture is located at one end of said elongated planar body and comprises a circular opening wherein a cup can be retained and sized such that cups of tapered construction can be inserted and retained around a perimeter thereof, said finger retaining aperture is located at an opposite end of said elongated planar body and comprises an opening wherein two fingers of said hand can be inserted to support the bottom of said plate, and said thumb aperture is located midway between said beverage container and finger retaining apertures of said elongated planar body and comprises a circular opening through which the thumb of said hand can be inserted allowing the base of the thumb to hold a rim of said plate held in said hand;

a beverage container support fastened to or integrally formed with said elongated planar body, adjacent to and extending below the beverage container aperture, said beverage container support intended to receive and hold the bottom of cups, cans, or containers that have no taper or are otherwise prevented from being supported by and against a rim of the beverage container aperture; and a finger support shelf fastened to or integrally formed with said elongated planar body adjacent to and extending below said finger aperture, said finger support shelf intended to extend under the fingers of said hand while said fingers support the bottom of said plate held in said hand in order to resist the overturning forces imposed on the holder by the weight of the beverage container retained in the beverage container aperture.

2. A holder for a beverage container according to claim 1, wherein said beverage container support for the bottom of beverage containers is a cup-like member, and wherein said cup-like member is provided with substantially cylindrical side walls and a bottom.

3. A holder for a beverage container according to claim 1, wherein said beverage container support for the bottom of beverage containers is a suspended hanger.

4. A holder for a beverage container according to claim 1, and further comprising a raised ring formed in said elongated planar body, said raised ring located adjacent to and circumferentially about said thumb aperture.

\* \* \* \* \*